Jan. 18, 1949.  R. C. HAMILTON ET AL  2,459,642
SEAL
Filed March 1, 1943
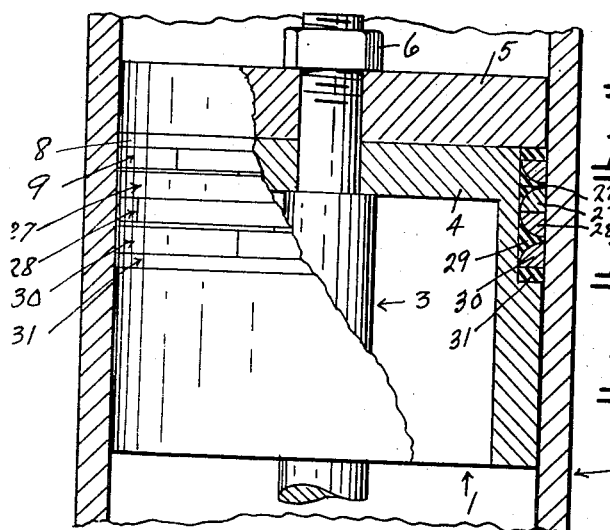
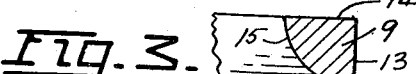
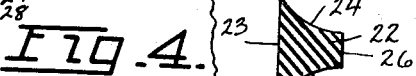
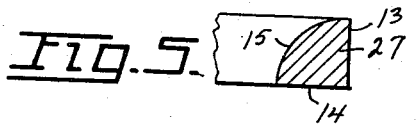
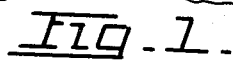
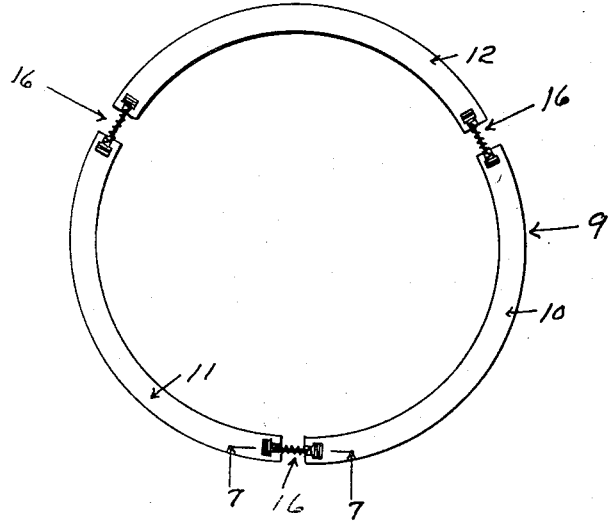
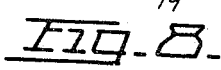
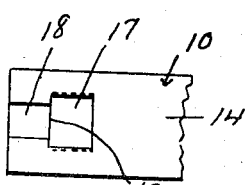
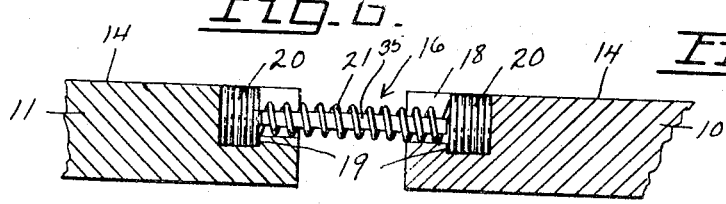
INVENTORS.
Roy C. Hamilton.
Edward S. Rothchild
BY
Boyken, Mohler & Beckley
ATTORNEYS.

Patented Jan. 18, 1949

2,459,642

UNITED STATES PATENT OFFICE 2,459,642

SEAL

Roy C. Hamilton, San Francisco, and Edward S. Rothchild, San Mateo, Calif., assignors to Rodpak Manufacturing Co., San Francisco, Calif., a corporation of Nevada Application March 1, 1943, Serial No. 477,554

5 Claims. (Cl. 309—28)

This invention relates to a seal for cylindrical reciprocating and rotary members.

One of the objects of the invention is the provision of an improved sealing means between relatively moving cylindrical members disposed one within the other, and which seal is self-adjusting under wear and use to perform its sealing function and will readily yield to accommodate itself to slight misalignments between one of such members and the other without impairment of its sealing function.

Another object is an improved seal adapted to be readily installed on a plunger or piston for insuring a tight seal between the plunger and a cylinder in which the plunger is mounted for relative reciprocatory movement of the plunger and cylinder and which seal is automatically adjustable to maintain its sealing function unimpaired under wear.

A still further object is the provision of improved means for facilitating the installation of the seal of this invention.

Other objects and advantages will appear in the drawings and specifications annexed hereto.

In the drawings, Fig. 1 is a part sectional, part elevational view of a plunger in a cylinder with the improved seal of this invention on the former.

Fig. 2 is an enlarged sectional view taken through one side of one of the two end rings of the seal.

Fig. 3 is an enlarged sectional view taken through one side of one of the rings that is adjacent one of the rings shown in Fig. 2.

Fig. 4 is an enlarged sectional view taken through one side of one of the rings that is adjacent the ring of Fig. 3.

Fig. 5 is an enlarged sectional view taken through one side of one of the segments of a ring that is adjacent the ring of Fig. 4.

Fig. 6 is a plan view of one of the rings of Fig. 1, and of which latter ring Fig. 3 is a sectional view through one side thereof.

Fig. 7 is an enlarged fragmentary sectional view along line 7—7 of Fig. 6.

Fig. 8 is an enlarged elevational view of one end of one of the segments of the ring of Fig. 6 which corresponds to the end of the segment shown at the right hand of Fig. 6.

In detail, referring to Fig. 1 a piston or plunger I is shown in a cylinder 2. This particular piston or plunger has a rod 3 that extends through coaxial openings in a head 4 that is rigid with the cylindrical walls of the plunger, and through a circular end plate 5 outwardly of said head. The said end plate is secured against said head by a nut 6 threaded onto the shaft, the latter being of reduced diameter where it passes through said end plate and head.

The end plate 5 is about the same diameter as the inside diameter of cylinder 2 and the end portion of the plunger adjacent said end plate is of substantially smaller outside diameter than the inside diameter of the cylinder while the remaining outside diameter of the plunger is of about equal to the inside diameter of the cylinder.

The foregoing construction provides an annular, outwardly opening recess around the cylinder in which our seal is adapted to be positioned, and the removable end plate merely facilitates the placing of the seal in said recess or groove. It is to be understood, however, that the recess may be formed in the outer side of the plunger or piston at any one or more points along its length, and the seal may be positioned in such recess or in each of several recesses without having a removable end plate or head. Also the plunger may be a shaft of substantially uniform diameter and may be rotatable in the cylinder or reciprocatory or both. The seal will retain its function under any of these conditions.

Referring to the elements making of the seal, the following description will commence with the uppermost element of Fig. 1 and will describe each in succession from said uppermost one to the bottom one.

The upper element 8 is preferably a continuous ring of resilient material such as rubber or synthetic rubber, which ring is rectangular in cross section and of an inside and outside diameter substantially equal to that of the bottom of the annular recess in the plunger and the outside diameter of the plunger. The upper flat side of the ring 8 is against the flat upper side of the recess (as viewed in Fig. 1).

Adjacent ring 8 is a metallic ring 9 that is divided into three equal segments 10, 11, 12 (Fig. 6). When the adjacent ends of the pairs of segments 10 to 12 are about together, but slightly spaced apart, the outside diameter of the ring thus formed is substantially equal to the outside diameter of the plunger or the inside diameter of the cylinder 2. The ring 9 may be of bearing metal, such as babbitt metal, or the like. The radially outwardly facing sides 13 of the segments 10, 11, 12 are flat so as to substantially fit against the inside of cylinder 2, and the upper surfaces 14 of the segments are also flat to fit against the flat adjacent surface of the ring 8. The remaining radially inwardly facing and axially downwardly facing sides 15 of each segment are curved in cross section to provide a continuous convex surface from the inner and lower ends of the flat upwardly and radially outwardly facing sides respectively of the segments.

The adjacent ends of each pair of segments 10 to 12 are connected by expansion coil spring 16 that are normally under compression when in position on the piston and in the cylinder, so as to constantly urge the segments apart under the yieldable or axially expanding tension of the springs.

Each of the ends of segments 10 to 12 is formed with a slot opening axially outwardly of the end of each segment and also opening outwardly of the side 14 thereof (Figs. 6 to 8).

The contour of the sides of these slots in cylindrical and the inner end portion 17 of each slot is enlarged (Fig. 7) while the remainder 18 of each slot that terminates at the outer end of each segment, is restricted providing a shoulder 19 (Fig. 7) at the juncture between the said enlarged and restricted portions.

Each spring 16 is formed at its opposite ends with a tightly coiled portion 20 (Fig. 7) that is adapted to fit in the enlarged portion 17 of each slot, while the part 21 of each spring that is intermediate the ends 20 thereof is of reduced diameter to extend through the restricted portion 18 of each slot. This intermediate part 21 is normally expanded and the depth of the portions 17, 18 of each slot is such that the springs, when they are in the slots, will not project above the surfaces of the side 14 of each segment.

When springs 16 are in position connecting the segments they will be held in the slots by shoulders 19 against being pulled therefrom axially of the spring but may be readily inserted into the slots through their open sides. Preferably the opposed free edges of the portion 18 of each slot are spaced apart a slightly shorter distance than the diameter of the enlarged end 20 of each spring so that a slight force will be necessary to push the end 20 of each spring into portion 17 of the slot, and when once in said portion, the enlarged end 20 will be yieldably held in place. This facilitates the assembly as the segments may be fully assembled and will be held together before placing on the plunger.

Next below ring 9 is a ring 22 that is of the same material as ring 8. This ring 22 (for economy of manufacture) may be a strip cut to a length substantially equal to the circumference of the bottom of the annular recess in the plunger and then positioned in the recess with its free ends in substantially abutting relation to form the ring.

The radially inwardly facing side 23 of the ring 22 is flat to correspond to the contour of the bottom of the recess in the plunger, while the axially outwardly facing sides 24, 25 thereof (in cross section) extend generally radially from its flat inner side and generally convergently (Fig. 4). These axially facing sides 24, 25 are of a concave contour in cross section that may be slightly flatter than the convex contour of the segments of ring 9. The outer side 26 of ring 22 may be parallel with the inner side 23 thereof.

Below ring 22 is another ring 27 (Fig. 1) that is identical with ring 9 in structure, hence the sides thereof corresponding to those of Fig. 3 will be similarly numbered. This ring 27 is reversed, top and bottom, from the position of ring 9 so that the convex side 15 thereof is next to the concave side 25 of ring 22.

Below ring 27 is another ring 28 identical with rings 9, 27 in structure but positioned the same as ring 9 so that the flat axially facing sides of the rings 27, 28 will lie together.

Below ring 28 is a ring 29 identical with ring 22 in structure with its upper concave side adjacent the lower convex side of ring 28 (Fig. 1), and below ring 29 is another ring 30 that is identical with ring 27 in both structure and relative positions of its sides, so that the upper convex side of the ring 30 is adjacent the lower concave side of ring 29.

A ring 31 that is identical with ring 8 is below ring 30 and this ring 31 is the lowermost ring of the sealing elements, and is adapted to engage the end of the recess in the piston that is opposite that engaged by ring 8.

The outside diameter of rings 22, 29 may be slightly less than the outside diameter of the main body of the plunger when the assembly of rings forming the seal are secured in the annular recess that is in the plunger.

In a plunger of the type shown in the drawing, the rings may be placed around the restricted upper end of the plunger before the end plate 5 is secured against the head of the plunger, but where the annular recess in the plunger is formed directly in the plunger sides, the rings may be assembled in such recess in generally the same way conventional piston rings are placed in the annular recesses in the piston.

When the plunger with the rings therein is positioned in cylinder 2, the rings 22, 29 will exert a yieldable generally radially outward force on rings 9, 27, 28 and 30 as well as tending to force rings 9, 30 oppositely outwardly and to force rings 27, 28 together.

The springs 16 will constantly urge the segments 10 to 12 of each of the rings 9, 27, 28 and 30 apart so as to yieldably urge said segments outwardly into sealing contact with the inner sides of cylinder 2, while the compressed rings 22, 29 will add their force to the segments. The rubber or synthetic rubber rings, due to their expansion, will also make a sliding seal with the cylinder walls to prevent leakage or by-passing of oil, water, steam, or the like.

The installation of the rings 9, 27, 28 and 30 is greatly facilitated by inserting a loose length of metal wire 35 (Fig. 7) into each coil spring after one of the ends 20 is in one of the ends of the segments, and then inserting the other end 20 in the adjacent end of the other segment. The length of each such piece of wire is slightly shorter than the maximum allowed compression of the spring so as not to restrict the necessary amount of compression. Each piece in each spring functions to prevent buckling of the portion of the spring between segments thus greatly facilitating the installation of the rings, and this is one feature of the invention.

It is to be understood that all of the rings are not absolutely required for all installations, but ordinarily the structure as described is preferred. The set of rings 8, 22, 27 and 31 in which the end rings are 8 and 31 may in some instances be used.

Having described our invention, we claim:

1. In a seal of the character described, a metal ring transversely divided into separate segments, the adjacent ends of said segments being each formed with a slot opening outwardly of the same lateral side of the ring and opening outwardly of the end of each segment; a coil spring extending between each pair of adjacent ends of said segments and into the slots in said ends through the end openings of said slots; means carried by said segments integral therewith removably securing the ends of said springs in said slots.

2. A construction as defined in claim 1, said means comprising a shoulder in one of the sides of each slot and the end of each spring in each slot being enlarged to engage said shoulder against withdrawal of the spring axially thereof from said slot.

3. A construction as defined in claim 1, a loose elongated piece of metal within each of said springs extending longitudinally thereof and of a length substantially that of the distance between the adjacent ends of each adjacent pair of segments when each of the said springs is expanded to its normal length, and said springs being normally expanded for substantial compression thereof.

4. In a seal of the character described, a pair of concentric metal rings respectively divided transversely thereof into segments, a ring of resilient material concentric with said pair and disposed between them, the sides of said metal rings that are adjacent said ring of resilient material being convex in cross sectional contour commencing at their radially inwardly facing sides and the sides of said resilient ring that are adjacent said metal rings being concave in cross-sectional contour commencing at their radially inwardly facing sides and substantially complementary to said convex contours of said metal rings, coil springs expansible and compressible circumferentially of said metal rings connecting the adjacent ends of the segments of such ring, the radially outwardly facing sides of said metal rings being flat transversely thereof and parallel with the axis of each such ring and the radially inwardly facing sides thereof being continuations of said convex curvature.

5. In a seal of the character described including a pair of metal rings and a resilient spacer ring between said pair, each of said metal rings having a cylindrical radially outwardly facing surface that is flat in cross sectional contour and the adjacent sides of said metal rings being convexly curved in cross-sectional contour in directions extending away from each other, the opposite generally axially facing sides of said spacer ring being of concave cross-sectional curvature complementary to the curvature of said metal rings, the outside diameter of said resilient ring being less than the outside diameter of said metal ring when said metal and resilient ring are in use, coil springs expansible and compressible circumferentially of said metal rings connecting the adjacent ends of the segments of each such ring tending to force said segments apart.

ROY C. HAMILTON.
EDWARD S. ROTHCHILD.

REFERENCES CITED

The following references are of record in the file of this patent:

UNITED STATES PATENTS

| Number | Name | Date |
|---|---|---|
| 298,871 | MacLaine | May 20, 1884 |
| 358,442 | Fausek | Mar. 1, 1887 |
| 922,635 | Sieger | May 25, 1909 |
| 934,627 | Rhodes | Sept. 21, 1909 |
| 1,481,160 | Switzer | Jan. 15, 1924 |
| 2,073,888 | Toward | Mar. 16, 1937 |
| 2,107,301 | Koether | Feb. 8, 1938 |
| 2,239,703 | Crawford | Apr. 29, 1941 |

FOREIGN PATENTS

| Number | Country | Date |
|---|---|---|
| 868 | England | Mar. 14, 1868 |